May 26, 1931.    V. S. BROWN    1,806,585
GRAIN SOAKING ATTACHMENT FOR WATERING TROUGHS
Filed April 18, 1929    2 Sheets-Sheet 1
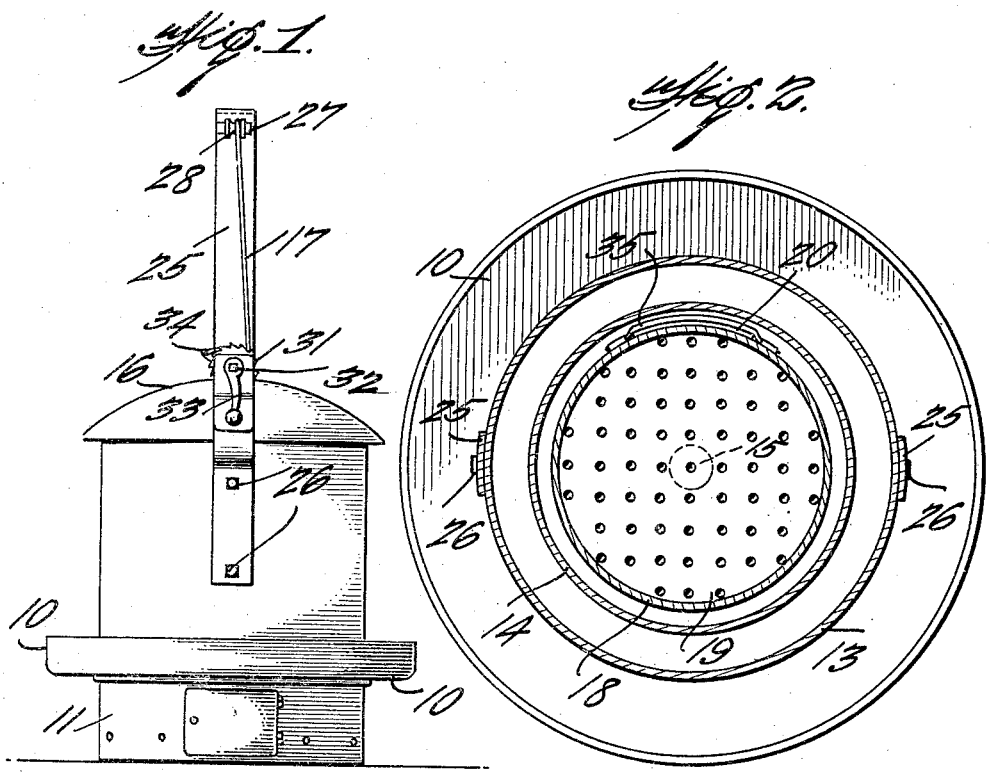
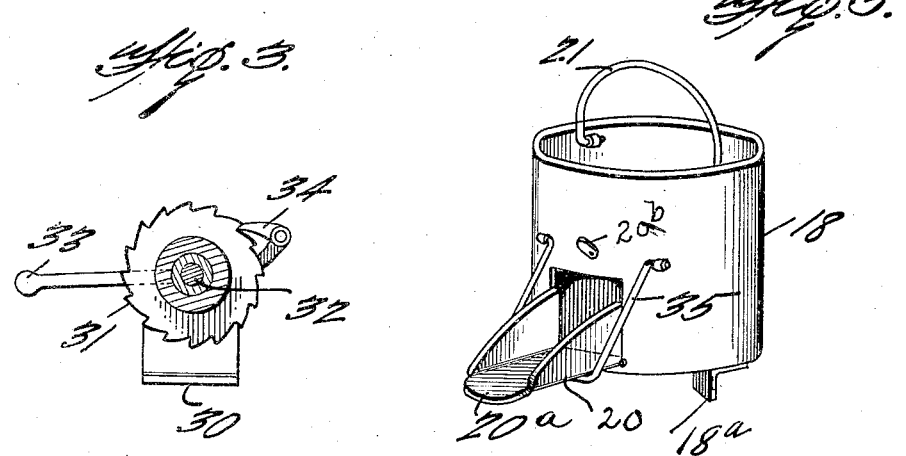
Inventor
Virgil S. Brown,
By
Attorney May 26, 1931. V. S. BROWN 1,806,585
GRAIN SOAKING ATTACHMENT FOR WATERING TROUGHS
Filed April 18, 1929 2 Sheets-Sheet 2
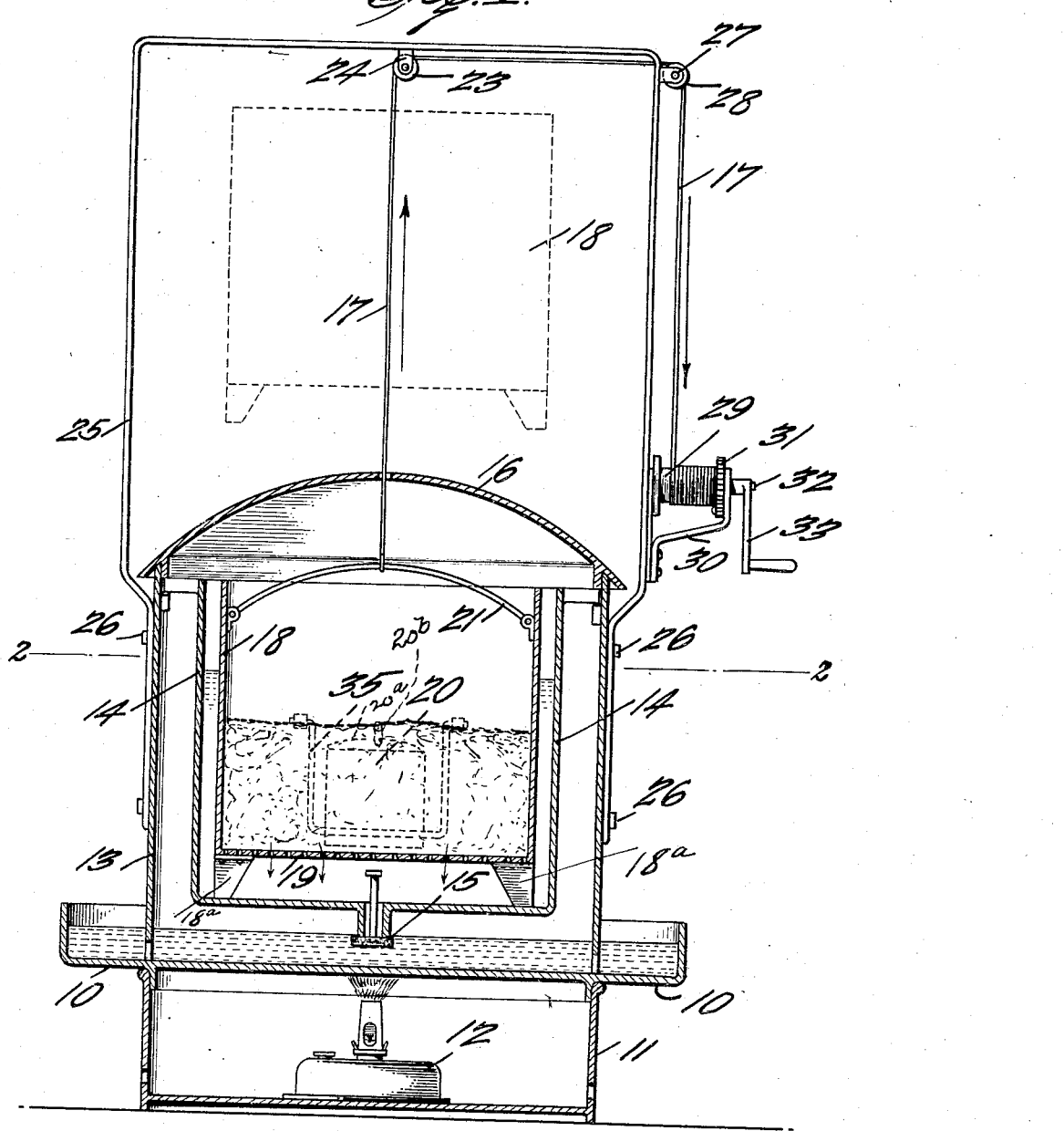
Inventor
Virgil S. Brown,
Attorney Patented May 26, 1931

1,806,585

UNITED STATES PATENT OFFICE

VIRGIL S. BROWN, OF CROMWELL, IOWA

GRAIN SOAKING ATTACHMENT FOR WATERING TROUGHS

Application filed April 18, 1929. Serial No. 356,124.

This invention relates to an apparatus for soaking grain, which may be used with benefit in the feeding of poultry, swine and other domestic animals, the same being associated with a watering trough, the type of which is used for watering live stock, such as hogs or the like, in which the water is kept at a temperature to prevent freezing, and usually associated with a heater located in a compartment or chamber below the water tank.

It is an object of this invention to produce a device mounted in operative relation to the tank and capable of being lowered into position to receive water from the tank and thereafter elevated for the removal of the contents of the device.

Specifically, in the present embodiment of the invention, the device is intended for soaking grain and it includes novel means which permits the water to reach the grain and thereafter drain therefrom when the device is elevated.

With the foregoing and other objects in view, the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of the device, partly in section;

Figure 2 illustrates a sectional view of the device on the line 2—2 of Fig. 4;

Figure 3 illustrates an enlarged detail sectional view of the hoisting mechanism;

Figure 4 illustrates an enlarged detail view of the device partly in section; and Figure 5 illustrates a perspective view of the receptacle.

In these drawings, 10 denotes the conventional type of watering trough for hogs and the like, 11 a heating chamber thereunder and 12 a heater, conventionally shown as a lamp, intended to maintain the water at a given temperature. A housing 13 rises from the trough and may be regarded as a part of the trough structure, although the inventor does not wish to be limited with respect to these details.

The water tank 14 is supported in the housing clear of the bottom thereof and it has a valved aperture 15, the valve being of a type which will remain closed so long as the water in the trough is at a predetermined level and will open to permit the water to flow into the trough when it recedes beyond a predetermined level. Preferably, the water tank is removably applied to the housing and it may be taken therefrom for cleaning or for repairing the valve or the like. The tank has an apertured cover 16 through the aperture of which a hoisting cord or cable 17 operates.

In the present embodiment of the invention, a grain soaking container is associated with the tank and it consists of a grain receptacle 18 having a perforated or foraminous bottom 19 through which water may flow into the receptacle, or through which it may escape when the grain receptacle is elevated, as will presently appear. A door 20 is hinged at its lower end in the side of the receptacle at the bottom thereof, and the said door has inwardly extending side flanges forming a trough-like extension intended to be held in an approximately horizontal position when the door is open to facilitate the removal of grain after it is soaked. A bail 21 is preferably applied to the grain receptacle in any appropriate way. It is shown in the drawings that the member 17 is connected to the bail and the said member operates over a pulley 23 rotatable in a bracket 24 carried by a frame 25, which frame is anchored to the housing 13 by fastenings 26, such as bolts or the like. The frame also constitutes an anchorage for a bracket 27 in which a pulley or sheave 28 is rotatable and over which the member 17 will run to a drum or windlass 29 rotatably mounted in a bracket, conventionally shown at 30. The type of bracket employed at this location may be changed to suit particular requirements and the inventor does not wish to be limited with respect to the particular construction.

It is shown that the windlass is associated with a ratchet wheel 31 which is rigid with it and it is intended that the drum of the windlass shall be carried by a shaft 32 which may be turned by suitable means, such as a crank handle 33 so that by manipulating the crank handle, the drum will be turned to wind the flexible element 17 thereon or to unwind it. The drum may be held at different positions of adjustment through the employment of a dog 34 suitably pivoted on a stationary part of the bracket to engage the teeth of the ratchet wheel and will be especially operative to hold the grain receptacle in an elevated position, as shown in dotted lines, Fig. 4. As the grain receptacle is elevated, the bail thereof comes in contact with the under surface of the cover of the water tank and the lid of the tank is elevated at the same time, or the lid of the water tank may be moved upwardly independently of the grain receptacle for permitting the grain to be delivered to the said grain receptacle. A bail 35 is pivotally mounted on the side of the grain receptacle in position to engage the door when open to hold the said door in horizontal position.

The door 20 has a lip or extension 20$^a$ which extends on the outer surface of the receptacle and lies thereagainst when closed. This lip is engaged by a latch 20$^b$ pivoted on the outer surface of the receptacle and operative to hold the door closed.

From an inspection of the drawings and the foregoing description, it will be apparent that when grain has been applied to the receptacle, it will receive water from the tank and the grain will become soaked. Thereafter, the grain receptacle will be elevated through the manipulation of the mechanism heretofore described and be held in such elevated position while water drains from the grain. The draining process can be continued until the grain is in the proper state for the ration intended.

The grain receptacle 18 has legs 18$^a$, as will appear from an inspection of Fig. 4.

I claim:

1. In a grain soaking attachment for a watering trough, a tank for supplying water to the trough, a grain receptacle having a perforated bottom, a door in the side of the receptacle, said door having flanges at its edges, means on the receptacle for holding the door approximately horizontally, and means for suspending the receptacle above the water tank.

2. In a grain soaking attachment, a trough, a water tank adapted to supply water to the trough, a grain receptacle having a perforated bottom, means for supporting the receptacle in the tank clear of the bottom thereof, a cover for the tank and receptacle, said cover having an aperture, a flexible element connected to the receptacle and extending through the said aperture, and means on which the flexible element is wound for raising and lowering the said receptacle.

3. In a grain soaking attachment, a tank for containing water, a grain receptacle having a perforated bottom, means for supporting the receptacle in the tank clear of the bottom thereof, a cover for the tank and receptacle, said cover having an aperture, a flexible element connected to the receptacle and extending through the said aperture, and means on which the flexible element is wound for raising and lowering the said receptacle.

4. In a grain soaking attachment, a grain receptacle having a perforated bottom, a water container to which the grain receptacle is to be delivered, a door in the side of the receptacle, said door having flanges at its edges, means on the receptacle for holding the door approximately horizontally, a flexible member connected to the receptacle, a windlass on which the flexible member is wound, and guiding pulleys engaging and supporting the said flexible member.

VIRGIL S. BROWN.